US012076739B1

(12) United States Patent
Lin

(10) Patent No.: US 12,076,739 B1
(45) Date of Patent: Sep. 3, 2024

(54) BIDET WITH FILTER

(71) Applicant: Xiamen Shengborui Technology Co., Ltd., Xiamen (CN)

(72) Inventor: Liye Lin, Xiamen (CN)

(73) Assignee: Xiamen Shengborui Technology Co., Ltd., Xiamen (CN)

( * ) Notice: Subject to any disclaimer, the term of this patent is extended or adjusted under 35 U.S.C. 154(b) by 0 days.

(21) Appl. No.: 18/622,699

(22) Filed: Mar. 29, 2024

(30) Foreign Application Priority Data

Sep. 13, 2023 (CN) ......................... 202322479241.6

(51) Int. Cl.
*E03D 9/08* (2006.01)
*B05B 15/40* (2018.01)

(52) U.S. Cl.
CPC ................ *B05B 15/40* (2018.02); *E03D 9/08* (2013.01)

(58) Field of Classification Search
CPC .................................. E03D 9/08; B05B 15/40
USPC .............................................................. 4/448
See application file for complete search history.

(56) References Cited

U.S. PATENT DOCUMENTS 8,261,377 B2 * 9/2012 Oh ............................ E03D 9/08 4/420.1
2002/0042946 A1 * 4/2002 Jeon .......................... E03D 9/08 4/420.4
2008/0201837 A1 * 8/2008 Oh ............................ E03D 9/08 4/420.5
2009/0025133 A1 * 1/2009 Oh ......................... A61H 19/44 4/448
2024/0115980 A1 * 4/2024 Jeong ........................ C02F 1/68

FOREIGN PATENT DOCUMENTS

CN 203878675 U 10/2014
CN 208611456 U 3/2019
CN 213285934 U 5/2021

* cited by examiner

*Primary Examiner* — Huyen D Le
(74) *Attorney, Agent, or Firm* — George D. Morgan

(57) ABSTRACT

Disclosed is a bidet with a filter, including a mounting base of the bidet, a filter element, and a seal cover. A mounting channel is arranged on a surface of the mounting base, an inner end portion of the mounting channel is connected to an internal waterway of the mounting base, and both ends of the internal waterway are respectively connected to a water inlet end and a water outlet end of the bidet. The filter element is assembled in the mounting channel, so that a water flow in the internal waterway is filtered by the filter element. The mounting channel connected to the internal waterway is designed on the mounting base of the bidet, the filter element is assembled in the mounting channel, and the mounting channel is movably sealed by the seal cover to prevent water leakage, so that the bidet itself has a filtering function.

9 Claims, 4 Drawing Sheets

BIDET WITH FILTER

CROSS-REFERENCE TO RELATED APPLICATIONS

The application claims priority to Chinese patent application No. 202322479241.6, filed on Sep. 13, 2023, the entire contents of which are incorporated herein by reference.

FIELD OF TECHNOLOGY

The present invention relates to the technical field of bidets, and particularly relates to a bidet with a filter.

BACKGROUND

A bidet is an effluent device for washing the defecating part of the lower part of a human body. Partial types of bidets also can serve as seats of toilets. Washing with the bidet after defecation can avoid the possibility that the defecating part is in direct contact with hands to avoid bacterial infection, so that the bidet is more sanitary.

In view of differences of water qualities in various regions and direct contact between an effluent of the bidet and the private part of the human body, to purify the water quality and improve the sanitary level, most bidets need to be equipped with filters for filtering impurities in water. The filter of the conventional bidet is mounted at a water inlet end of the bidet, that is, the filter is connected between a water inlet pipe and a water inlet of the bidet. When the service time of the filter reaches the end of the service life and the filter element needs to be replaced, the connection between the filter and the water inlet pipe/bidet is often separated with a wrench and cannot be operated with a bared hand. A water inlet joint of the bidet is usually arranged below a mounting base of the bidet, so that the operating space is narrow, resulting in a difficult and time- and labor-consuming operation of detaching and replacing the filter element in the prior art. Multiple times of detachment of the water inlet of the bidet may cause screw looseness, which results in water leakage.

SUMMARY

An object of the present invention is to provide a bidet with a filter, which solves the problems in the prior art. The filter element of the bidet can be replaced conveniently, so that the bidet is easy and rapid to operate.

In order to achieve the above object, the present invention adopts the following technical solution:

A bidet with a filter includes a mounting base of the bidet, a filter element, and a seal cover. A mounting channel is arranged on a surface of the mounting base, an inner end portion of the mounting channel is connected to an internal waterway of the mounting base, and both ends of the internal waterway are respectively connected to a water inlet end and a water outlet end of the bidet. The filter element is assembled in the mounting channel, so that a water flow in the internal waterway is filtered by the filter element. The seal cover is hermetically mounted on an outer end portion of the mounting channel.

A first water passing cavity and a second water passing cavity are arranged in the mounting base; a water passing channel is connected between the first water passing cavity and the second water passing cavity; the inner end portion of the mounting channel is connected to the water passing channel, and an end portion of the filter element is arranged in a fit manner in the water passing channel; and a first cartridge and a second cartridge are respectively mounted in the first water passing cavity and the second water passing cavity, and the first cartridge and the second cartridge are respectively used for adjusting a water temperature and an effluent mode of the bidet.

A rib is arranged on an inner wall of the water passing channel, the rib abuts against an end surface of the filter element, and a plurality of through holes are formed in the end surface of the filter element; and the rib abuts against the end surface of the filter element to divide the through holes of the filter elements into water inlet holes and water outlet holes.

Preferably, the through holes are formed in both end surfaces of the filter element.

A cold water pipe joint and a hot water pipe joint are arranged on a bottom surface of the mounting base and the cold water pipe joint and the hot water pipe joint both are connected to the first water passing cavity.

The mounting base includes a water passing body and a bottom plate inside, and an upper shell and a lower shell sleeved on the surfaces of the water passing body and the bottom plate; and the mounting channel, the first water passing cavity, the second water passing cavity, and the water passing channel are formed on the water passing body, and the cold water pipe joint and the hot water pipe joint are formed on the bottom plate.

Preferably, the water passing body is provided with a connecting pipe, and the connecting pipe extends to the surface of the mounting base; and the mounting channel is formed on an axis of the connecting pipe.

Preferably, an external thread is arranged on an outer end portion of the connecting pipe, a mounting annular groove is formed in an inner side of the external thread, and a seal ring is embedded into the mounting annular groove; and the seal cover is provided with an internal thread matched with the external thread, and the seal cover is in threaded connection to the connecting pipe and is in close fit with the seal ring.

The mounting channel is arranged on a side surface of the mounting base.

By adopting the above technical solution, the present invention has the following beneficial effects:

The mounting channel connected to the internal waterway is designed on the mounting base of the bidet, the filter element is assembled in the mounting channel, and the mounting channel is movably sealed by the seal cover to prevent water leakage, so that the bidet itself has a filtering function. A user does not need to arrange a filter at the water inlet end of the bidet, so that the mounting cost of a user terminal is lowered. Moreover, when it is needed to replace the filter element, the filter element can be taken out by separating the seal cover with a bared hand from the surface of the mounting base. Compared with a conventional mounting mode, the bidet is simpler to operate, and the disassembling and assembling efficiency is improved.

DESCRIPTION OF NUMERALS IN THE DRAWINGS

Figure 1:
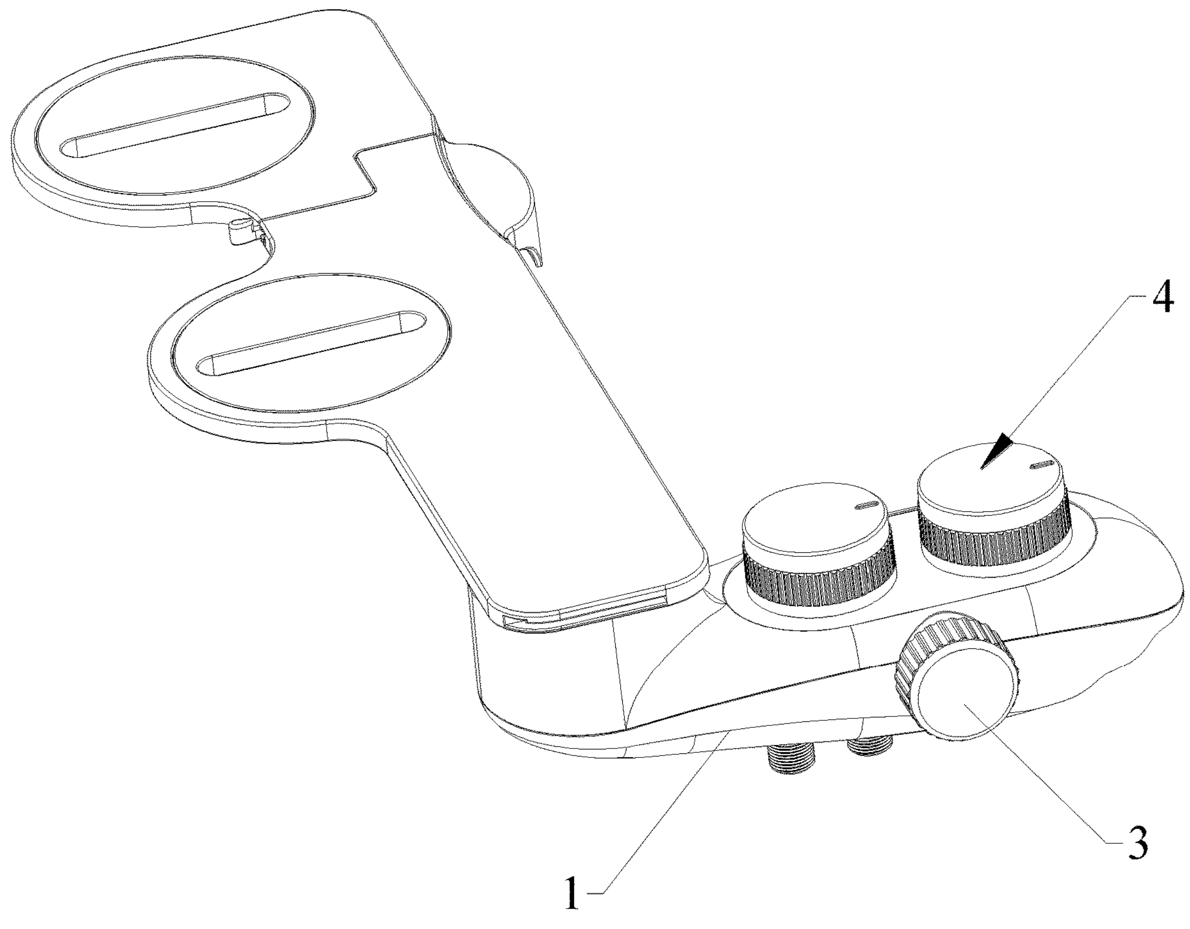
FIG. 1 is a stereogram of a specific embodiment of the present invention.
Figure 2:
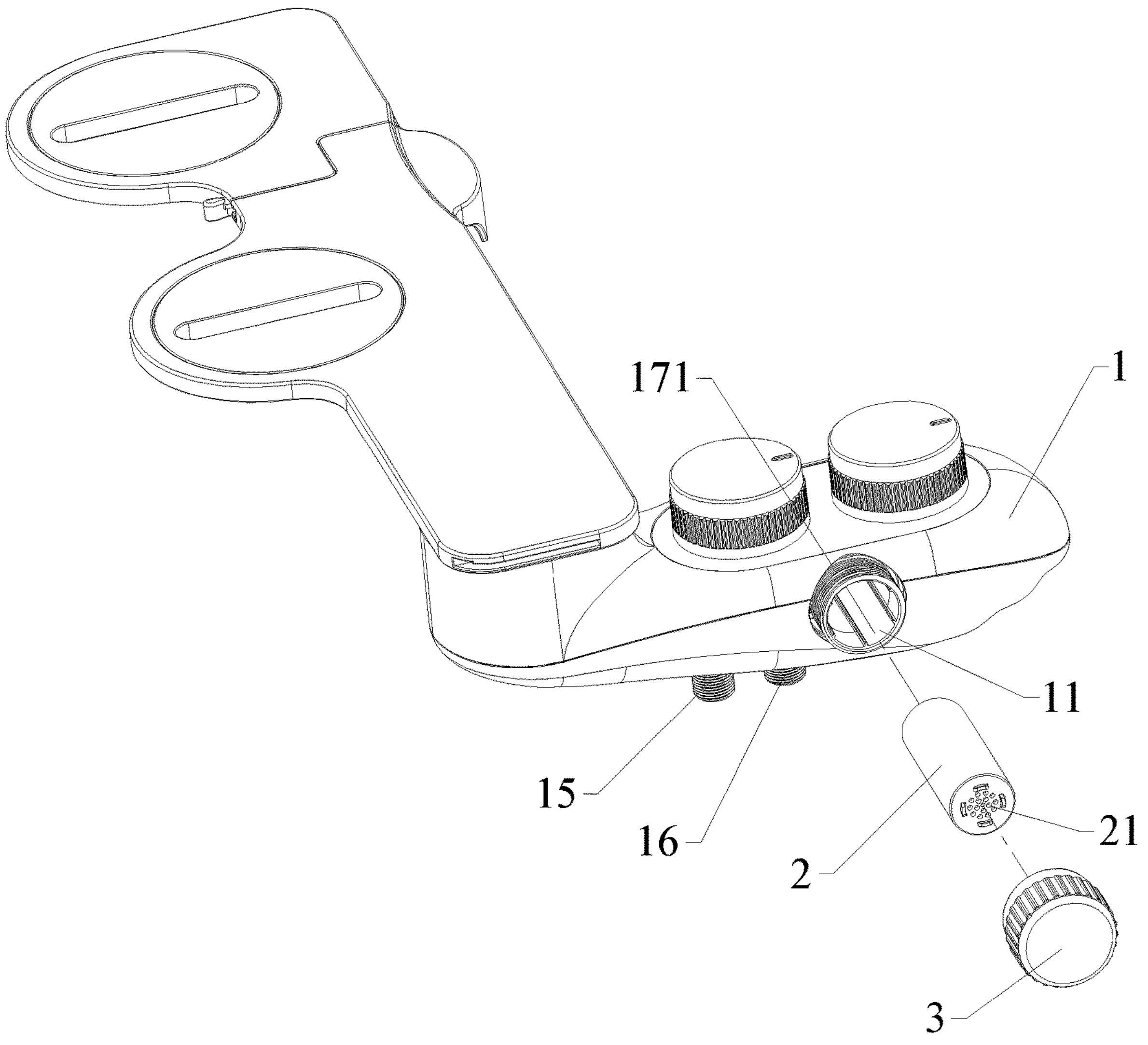
FIG. 2 is an exploded view of the specific embodiment of the present invention.

1—mounting base;
11—mounting channel;
12—first water passing cavity;
13—second water passing cavity;
14—water passing channel;
141—rib;
15—cold water pipe joint;
16—hot water pipe joint;
17—connecting pipe;
171—external thread;
172—mounting annular groove;
1*a*—water passing body;
1*b*—bottom plate;
1*c*—upper shell;
1*d*—lower shell;
2—filter element;
21—through hole;
3—seal cover;
31—internal thread;
4—control mechanism;
5—first cartridge;
6—second cartridge;
7—seal ring.

DESCRIPTION OF THE EMBODIMENTS

In order to further explain the technical solution of the present invention, the present invention will be described in detail below through specific embodiments.

In order to make objects, technical solutions and advantages of the embodiments of the present invention clearer, description will be made on technical solution in the embodiment of the present invention below in combination with drawings in the embodiment of the present invention. It is apparent that the described embodiments are a part of embodiments of the present invention rather than all the embodiments. Components in the embodiments of the present invention described and illustrated in the drawings herein may usually be arranged and designed in various different configurations.

Therefore, detailed description on the embodiments of the present invention provided in the drawings is not intended to limit the scope of the present invention claimed, but only to represent selected embodiments of the present invention. On the basis of the embodiments in the present invention, all other embodiments obtained by those of ordinary skill in the art without making creative efforts fall into the scope of protection of the present invention.

It is to be noted that similar mark numbers and letters represent similar items in the drawings below, such that once a certain item is defined in a drawing, it is unnecessary to further define and explain it in the subsequent drawings.

In the descriptions of the embodiment of the present invention, it is to be noted that orientation or position relationships indicated are orientation or position relationships shown in the drawings, or orientation or position relationships of the product of the present invention usually placed during use, or orientation or position relationships usually understood by those skilled in the art, are only used to simplify the embodiment of the present invention to facilitate description of the present invention, rather than indicating or implying that indicated devices or components must be in specific orientations or structured and operated in specific orientations, and thus shall not be understood as limits to the present invention.

In addition, the terms "first", "second", "third" and the like are only used for a description purpose rather than being construed to indicate or imply relative importance or implicitly indicate the quantity of indicated technical features. Thus, a feature defined with "first" and "second" may explicitly or implicitly include one or more features. In the description of the present invention, "plurality" means two or more, unless expressly specified otherwise.

In the description of the embodiment of the present invention, it is to be noted that, unless otherwise explicitly specified and defined, the terms "arranging", "mounting", "connecting" and "connection" shall be understood in a broad sense, for example, they may be a fixed connection, a detachable connection, or an integrated connection; may be a mechanical connection, or an electrical connection; and may be a direct connection, or an indirect connection via an intermediate medium, or communication inside two elements or an interactive relationship between the two elements. Those of ordinary skill in the art can understand specific meaning of the terms in the present invention under specific circumstances.

In the present invention, unless otherwise specified and defined, the first feature is "above" or "below" the second feature, which may either include direct contact of the first feature and the second feature or include indirect contact of the first feature and the second feature but contact through other features therebetween. Moreover, the first feature is "on", "above" and "over" the second feature, which includes that the first feature is right above and obliquely above the second feature or merely indicates that the horizontal height of the first feature is higher than that of the second feature. The first feature is "below", "under", and "beneath" the second feature, which includes that the first feature is right below and obliquely below the second feature or merely indicates that a level of the first feature is lower than that of the second feature.

The disclosure below provides many different embodiments or examples to realize different structures of the present invention. To simplify the disclosure of the present invention, parts and arrangement in specific examples are described below. Of course, they are merely exemplary and are not intended to limit the present invention. Besides, reference numbers and/or reference letter can be repeated in different examples in the present invention. Such repetitions are only for the purpose of simplification and clarification, rather than indicating the relationship between various embodiments and/or arrangement discussed themselves.

In addition, the present invention provides examples of various specific processes and materials. Those of ordinary skill in the art can realize applications of other processes and/or use of other materials.

Referring to FIGS. 1-4, the present invention discloses a bidet with a filter, including a mounting base 1 of the bidet, a filter element 2, and a seal cover 3;

the mounting base 1 is also known as a control handle of the bidet in the industry, and is mainly used to mount a control mechanism 4 of the bidet; the control mechanism 4 can realize functions of adjusting water temperature and functions of the bidet, and it is the mature prior art, which is not described repeatedly herein;

a mounting channel 11 is arranged on a surface of the mounting base 1, an inner end portion of the mounting channel 11 is connected to an internal waterway of the mounting base 1, and both ends of the internal waterway are respectively connected to a water inlet end and a water outlet end of the bidet;

the filter element 2 is assembled in the mounting channel 11, so that a water flow in the internal waterway is filtered by the filter element 2; and the seal cover 3 is hermetically mounted on an outer end portion of the mounting channel 11.

A specific embodiment of the present invention is illustrated below.

In the embodiment, a first water passing cavity 12 and a second water passing cavity 13 are arranged in the mounting base 1; a water passing channel 14 is connected between the first water passing cavity 12 and the second water passing cavity 13; the inner end portion of the mounting channel 11 is connected to the water passing channel 14, so that an end portion of the filter element 2 mounted in the mounting channel 11 can be arranged in a fit manner in the water passing channel 14; and a first cartridge 5 and a second cartridge 6 are respectively mounted in the first water passing cavity 12 and the second water passing cavity 13; corresponding to functional setting of the bidet, the first cartridge 5 and the second cartridge 6 are respectively used for adjusting a water temperature and an effluent mode of the bidet (for example, buttock washing, gynecological washing, self-cleaning and the like). The first cartridge 5 and the second cartridge 6 are a part of the control mechanism 4. That is, in the embodiment, the filter element 2 is mainly arranged between the water temperature adjusting cartridge and the function switching cartridge. An influent of the bidet is filtered by the filter element 2 after cold and hot water is mixed, and then the influent flows to different waterways according to user set modes to realize an effluent. In other embodiments, the filter element 2 (i.e., the mounting channel 11) can be arranged at the water inlet end of the first water passing cavity 12, so that the influent of the bidet is filtered first and then passes through the cartridges.

Figure 3:
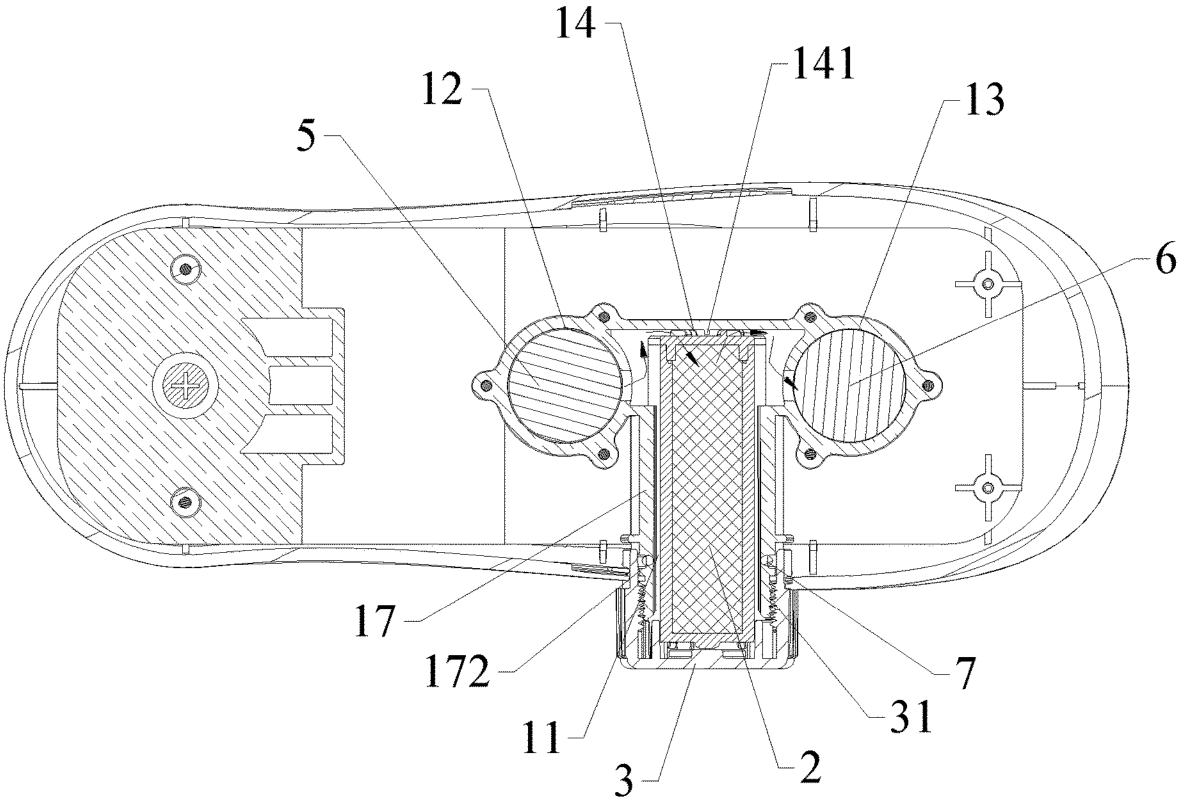
FIG. 3 is a section view I of the specific embodiment of the present invention.
Figure 4:
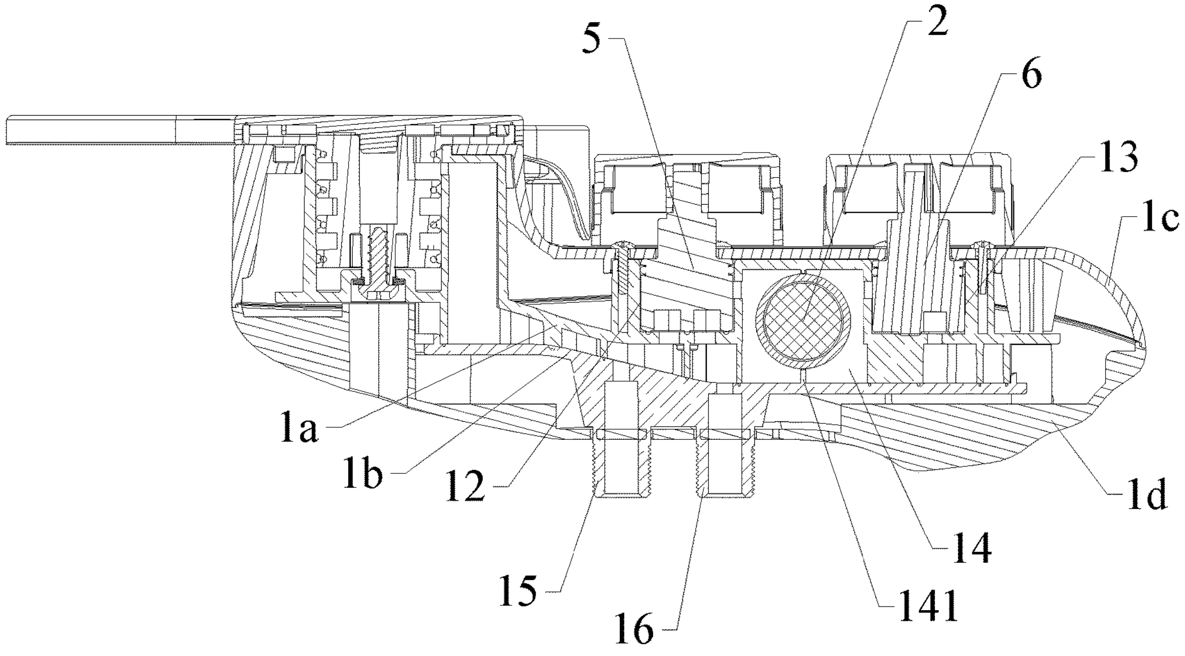
FIG. 4 is a section view II of the specific embodiment of the present invention.

During specific implementation of the embodiment, a rib 141 is arranged on an inner wall of the water passing channel 14, the rib 141 abuts against an end surface of the filter element 2, and a plurality of through holes 21 are formed in the end surface of the filter element 2. After the rib 141 abuts against an end surface of the filter element 2, it divides the through holes 21 of the filter element 2 into two portions. The portion close to the first water passing cavity 12 is a water inlet hole and the portion close to the second water passing cavity 13 is a water outlet hole. The space between the filter element 2 and the water passing channel 14 is also divided into two portions by the rib 141. Referring to FIG. 3, such a structure makes water flowing out of the first water passing cavity 12 enter the water inlet hole of the filter element 2 first as far as possible. After being filtered by a filter material inside the filter element 2, the water flows out from the water outlet hole of the filter element 2 and further flows into the second water passing cavity 13.

Further, the through holes 21 are formed in both end surfaces of the filter element 2, so that the filter element 2 can be mounted disorderly. Any portion faces the mounting channel 11 and the filter element is inserted into the mounting channel to complete assembly of the filter element 2. Of course, the end surface of the filter element 2 abuts against the inner wall of the water passing channel 14 tightly, and the through holes 21 of the filter element 2 are designed in a peripheral surface of the filter element 2, so that the through holes 21 directly face the outlet of the first water passing cavity 12 and the inlet of the second water passing cavity 13, and when the water flows, it can only flow through the filter element 2 to be filtered.

During specific implementation of the embodiment, a cold water pipe joint 15 and a hot water pipe joint 16 are arranged on a bottom surface of the mounting base 1 and the cold water pipe joint and the hot water pipe joint both are connected to the first water passing cavity 12. The mixing proportion of cold water and hot water is realized by the first cartridge 5.

During specific implementation of the embodiment, the mounting base 1 includes a water passing body 1*a* and a bottom plate 1*b* inside, and an upper shell 1*c* and a lower shell 1*d* sleeved on the surfaces of the water passing body 1*a* and the bottom plate 1*b*. The mounting channel 11, the first water passing cavity 12, the second water passing cavity 13, and the water passing channel 14 are formed on the water passing body 1*a*, and the cold water pipe joint 15 and the hot water pipe joint 16 are formed on the bottom plate 1*b*, so that mould opening and production are facilitated. The upper shell 1*c* and the lower shell 1*d* play protecting and beatifying roles.

Further, the water passing body 1*a* is provided with a connecting pipe 17, and the connecting pipe 17 extends to the surface of the mounting base 1; and the mounting channel 11 is formed on an axis of the connecting pipe 17.

Moreover, an external thread 171 is arranged on an outer end portion of the connecting pipe 17, a mounting annular groove 172 is formed in an inner side of the external thread 171, and a seal ring 7 is embedded into the mounting annular groove 172; and the seal cover 3 is provided with an internal thread 31 matched with the external thread 171, and the seal cover 3 is in threaded connection to the connecting pipe 17 and is sealed and prevents water leakage through a screw and the seal ring 7.

The mounting channel 11 is arranged on a side surface of the mounting base 1, so that design space such as the control mechanism 4 (a top surface of the mounting base 1) and the water inlet mechanism (a joint on a bottom surface of the mounting base 1) can be prevented from being occupied. Moreover, the seal cover 3 assembled on the side surface of the mounting base 1 is convenient to detach and mount.

Through the above solution, the mounting channel 11 connected to the internal waterway is designed on the mounting base 1 of the bidet, the filter element 2 is assembled in the mounting channel 11, and the mounting channel 11 is movably sealed by the seal cover 3 to prevent water leakage, so that the bidet itself has a filtering function. A user does not need to arrange a filter at the water inlet end of the bidet, so that the mounting cost of a user terminal is lowered. Moreover, when it is needed to replace the filter element 2, the filter element 2 can be taken out by separating the seal cover 3 with a bared hand from the surface of the mounting base 1. Compared with a conventional mounting mode, the bidet is simpler to operate, and the disassembling and assembling efficiency is improved.

The above embodiments and drawings are not intended to define product shape and pattern of the present invention. Any moderate change or modification made by those skilled in the art shall be regarded within the scope of the patent of the present invention.

What is claimed is:

1. A bidet with a filter, comprising a mounting base of the bidet, a filter element, and a seal cover, wherein a mounting channel is arranged on a surface of the mounting base, an inner end portion of the mounting channel is connected to an internal waterway of the mounting base, and both ends of the internal waterway are respectively connected to a water inlet end and a water outlet end of the bidet;

the filter element is assembled in the mounting channel, so that a water flow in the internal waterway is filtered by the filter element; and the seal cover is hermetically mounted on an outer end portion of the mounting channel.

2. The bidet with a filter according to claim 1, wherein a first water passing cavity and a second water passing cavity are arranged in the mounting base; a water passing channel is connected between the first water passing cavity and the second water passing cavity; the inner end portion of the mounting channel is connected to the water passing channel, and an end portion of the filter element is arranged in a fit manner in the water passing channel; and a first cartridge and a second cartridge are respectively mounted in the first water passing cavity and the second water passing cavity, and the first cartridge and the second cartridge are respectively used for adjusting a water temperature and an effluent mode of the bidet.

3. The bidet with a filter according to claim 2, wherein a rib is arranged on an inner wall of the water passing channel, the rib abuts against an end surface of the filter element, and a plurality of through holes are formed in the end surface of the filter element; and the rib abuts against the end surface of the filter element to divide the through holes of the filter elements into water inlet holes and water outlet holes.

4. The bidet with a filter according to claim 3, wherein the through holes are formed in both end surfaces of the filter element.

5. The bidet with a filter according to claim 2, wherein a cold water pipe joint and a hot water pipe joint are arranged on a bottom surface of the mounting base and the cold water pipe joint and the hot water pipe joint both are connected to the first water passing cavity.

6. The bidet with a filter according to claim 2, wherein the mounting base comprises a water passing body and a bottom plate inside, and an upper shell and a lower shell sleeved on the surfaces of the water passing body and the bottom plate; and the mounting channel, the first water passing cavity, the second water passing cavity, and the water passing channel are formed on the water passing body, and the cold water pipe joint and the hot water pipe joint are formed on the bottom plate.

7. The bidet with a filter according to claim 6, wherein the water passing body is provided with a connecting pipe, and the connecting pipe extends to the surface of the mounting base; and the mounting channel is formed on an axis of the connecting pipe.

8. The bidet with a filter according to claim 7, wherein an external thread is arranged on an outer end portion of the connecting pipe, a mounting annular groove is formed in an inner side of the external thread, and a seal ring is embedded into the mounting annular groove; and the seal cover is provided with an internal thread matched with the external thread, and the seal cover is in threaded connection to the connecting pipe and is in close fit with the seal ring.

9. The bidet with a filter according to claim 3, wherein the mounting channel is arranged on a side surface of the mounting base.

* * * * *